Patented Aug. 14, 1951

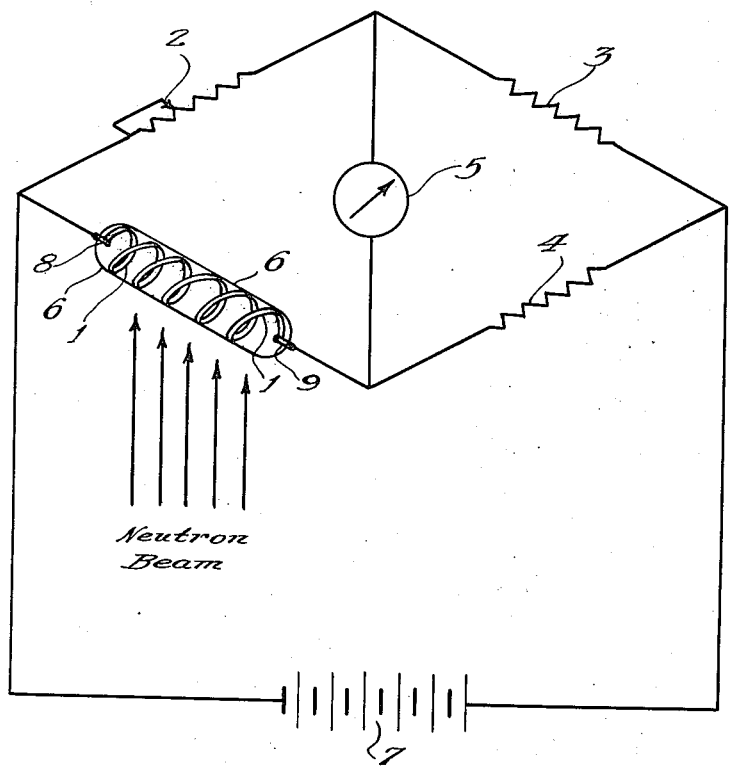

2,564,626

UNITED STATES PATENT OFFICE 2,564,626

MEASURING DEVICE AND METHOD OF MEASURING

Andrew M. MacMahon, Houston, Tex., and Arthur H. Snell, Oak Ridge, Tenn., assignors to the United States of America as represented by the United States Atomic Energy Commission Application March 10, 1945, Serial No. 582,092

10 Claims. (Cl. 250—83.6)

Our invention relates to a method and apparatus for measuring integrated neutron activity, and is particularly useful in measuring the integrated neutron activity in a neutronic reactor, although it may also be used for measuring integrated neutron activity resulting from other neutron sources.

In the past, various methods and devices have been used for measuring integrated neutron activity, that is, the product of time and neutron density, such as, ionization chambers coupled with electrometer and integrating circuits for measuring ionization currents caused by a neutron stream, but such devices have the disadvantage of being difficult to calibrate and to keep in adjustment due to cathode drift and other similar disturbing transient effects. Furthermore, such electronic apparatus is delicate, sensitive in operation, and relatively expensive.

An object of our invention is to provide a method and apparatus for measuring integrated neutron activity that is devoid of the above mentioned disadvantages and that is relatively simple, rugged, relatively inexpensive and reliable in operation.

A more specific object of our invention is to provide a method and apparatus for measuring the integrated neutron activity resulting from a neutron source, such as, for example, a neutronic reactor.

In general our invention involves the principle of inserting into a neutron stream having the intensity under measurement, an element that will undergo nuclear reactions and transmutation by neutron absorption and radioactive decay to produce an end product comprising a different element having an electrical conductivity markedly different from the conductivity of the original element, and to utilize this change in conductivity as a measure of the integrated neutron activity or intensity to which the original element was exposed.

Other objects and advantages will become more apparent from the following description taken together with the drawing, in which the single figure is a schematic diagram of a Wheatstone bridge circuit illustrating the teachings of our invention and adopted for measuring integrated neutron activity.

Referring more particularly to the drawing, numerals 1, 2, 3, and 4 denote resistance elements in the four legs of a Wheatstone bridge circuit. Resistance elements 2, 3, and 4 are non-inductively wound standard resistances, the resistance element 2 being variable and being used as a temperature compensating resistor. Resistance element or specimen 1 is the sensitive unit whose resistance value, or change in resistance resulting from neutron bombardment, is to be measured, as will appear hereinafter. Numeral 5 denotes a galvanometer for indicating unbalance in the Wheatstone bridge, or, if desired, may comprise a measuring instrument or recorder for measuring the amount of the unbalance. A low potential source, such as a battery 7, is used to energize the bridge circuit. In order to measure integrated neutron activity, that is, the product of neutron density and time, resistance element 1 is placed in the path of a neutron stream or beam as illustrated by the arrows in the drawing. In actual practice this may be accomplished, for example, by placing resistance element 1 inside or adjacent to the periphery of a neutronic reactor in a neutron beam the intensity of which is under measurement and the integrated neutron activity of which is to be measured over a period of time.

Broadly speaking, a neutronic reactor is a device comprising a plurality of uranium or other fissionable elements dispersed in a neutron slowing material or moderator, such as graphite or heavy water, capable of slowing fast neutrons to thermal energy, and that is built of sufficient size to produce a self-sustaining nuclear chain reaction. Our invention is particularly applicable for use in neutronic reactors capable of having high neutron density and of being operated over continuous periods of time.

To measure the integrated neutron activity in such a neutronic reactor, the bridge circuit is first balanced and thereafter resistance element 1 is placed inside the reactor, that is, in the neutron stream. By noting the temperature of resistance element 1 as determined by a thermocouple or other suitable temperature indicating instrument at the time of reading of the new value of resistance element 1, as will appear more clearly hereinafter, a correction may be applied to variable resistance element 2 to compensate for the change of resistance of element 1 due to increase in temperature of element 1 because of its close proximity to the heated materials forming the neutronic reactor. The remainder of the Wheatstone bridge circuit is located exteriorly of the reactor and has suitable conductors extending through the outer wall of the neutronic reactor that are connected to the resistance elements 2 and 4 by Phosphor bronze lead-in wires 8 and 9, for example, contained in tube 6.

The outstanding feature of our invention embodies the specimen or resistance element 1 and its application. Resistance element 1 comprises any suitable material or element that undergoes an appreciable change in resistance when transmuted to a different material or element by neutron capture as the result of exposure to neutrons over a period of time. Resistance element 1, for example, may be made in the form of a helical-spiral coating inside a glass vacuum tube 6, if the resistance material is one which cannot be readily formed as a metallic sheet or strip, such as, for example, boron. A vacuum of about $10^{-3}$ mm.Hg is suitable. It is known that boron when subjected to continued neutron bombardment will undergo a nuclear change and transmute to lithium which has an appreciably different electrical resistance than boron, which change in resistance may be readily and accurately measured by a Wheatstone bridge or other resistance measuring device. A typical reaction may be represented as follows:

$$_5B^{10} + _0n^1 \rightarrow _3Li^7 + _2He^4$$

An alternate arrangement is to commence with a helical-spiral strip of lithium as a coating in a vacuum tube 6 and to subject the lithium to a stream of neutrons so as to convert it directly to helium and hydrogen. A typical reaction may be represented as follows: $_3Li^6 + _0n^1 \rightarrow _1H^3 + _2He^4$. In this case, it should be noted that prior to complete conversion, only a portion of the lithium is transmuted to hydrogen and helium consequently there will remain after bombardment a lithium helical-spiral or smaller cross-sectional area, and therefore, of higher resistance than the original spiral. Therefore, by measuring the amount of increase in resistance of the remaining lithium helical-spiral after a predetermined bombardment with neutrons, it is possible to obtain an indication of the integrated neutron activity to which the strip was exposed over any given time period.

A further modification may comprise a strip of aluminum used as resistance element 1 in which case vacuum tube 6 is not needed. When the aluminum strip is bombarded by neutrons, it converts or transmutes to silicon having an appreciably lower electrical conductivity than the aluminum. Likewise a strip of lead may be used instead of aluminum or lithium. The lead will convert or transmute to bismuth again changing the electrical resistance. In general, any other material or element whose resistance changes appreciably, that is by readily measurable amounts, when bombarded with neutrons, may be used.

More specifically, the criteria involved in the selection of a suitable material forming the sensitive unit, that is resistance element 1, for use in measuring the integrated neutron activity in a neutronic reactor are as follows: (1) the capture cross-section for thermal neutrons, that is to say, the absorption ability for thermal neutrons should be as great as is consistent with the normal operation of the reactor; (2) the related nuclear reaction should be as simple as possible giving rise to a product which dominates all others in effecting change of electrical resistance; (3) the product should have a very long life in comparison with the period of operation of the reactor, (4) the difference between the electrical resistivities of the product and parent substance should be as large as possible; and (5) the physical properties of both the product and the parent substance should be such as to insure the stability of the electrical resistance of the sensitive unit, namely resistance element 1, during periods of measurments.

It will be seen, therefore, that we have provided an efficient apparatus and method of measuring integrated neutron activity, including an element that will undergo nuclear reactions to produce an end product having an electrical conductivity markedly different from the conductivity of the element before being subjected to neutron bombardment, and we have utilized this change of conductivity or resistance as a measure of the integrated neutron intensity.

It should be noted that the circuit shown and the resistance materials described are merely illustrative and not limiting with respect to the present invention. Alternate materials having the above mentioned characteristics will readily suggest themselves to others skilled in the art after having had the benefit of the teachings of our invention. Likewise resistance measuring devices other than a Wheatstone bridge may be used for measuring the above described change in electrical resistance due to transmutation accompanying neutron bombardment. In fact, it may be possible even to analyze the transmuted elements or end product by visual means only, such as a microscope, or even by observation by the naked eye for changes in color, or other physical properties. By testing for changes in physical or chemical properties, the end product may be identified. For this reason, the invention should be restricted only insofar as set forth in the following claims.

We claim:
1. The method of measuring integrated neutron activity, comprising measuring the resistance of a solid elongated body, said body consisting of elements transmuting to gaseous elements under neutron bombardment, exposing the body to neutron radiation to obtain partial transmutation to a gaseous element, and measuring the electrical resistance of the body after such exposure.

2. The method of measuring integrated neutron activity comprising measuring the resistance of an elongated lithium body, exposing the lithium body to neutron radiation to obtain partial transmutation to gaseous elements, and measuring the electrical resistance of said lithium body after such exposure.

3. Apparatus for measuring integrated neutron activity comprising an electrical bridge circuit including, in one of its legs, a strip of lithium in the form of a coating that readily transmutes into gases of appreciably different electrical resistance than that of lithium when subjected to continued neutron bombardment.

4. Apparatus for measuring integrated neutron activity comprising an electrical bridge circuit including, in one of its legs, a strip of lithium in the form of a coating that readily transmutes into gases of appreciably different electrical resistance than that of lithium when subjected to continued neutron bombardment and including, in another leg, a temperature compensating resistor.

5. Apparatus for measuring integrated neutron activity comprising an electrical bridge circuit including, in one of its legs, an evacuated tube having an internal coating in the form of a strip of material that transmutes to a gas after being subjected to continued neutron bombardment.

6. Apparatus for measuring integrated neutron activity comprising an electrical bridge circuit including, in one of its legs, an evacuated tube having an internal coating in the form of a strip of lithium that transmutes to gas after being subjected to continued neutron bombardment.

7. The method of measuring integrated neutron activity comprising, measuring the conductivity of a thin strip consisting of elements transmuting into gaseous elements under neutron bombardment, exposing the strip to neutron radiation, and again measuring the conductivity of the strip.

8. The method of measuring integrated neutron activity comprising, measuring the conductivity of a thin lithium strip, exposing the strip to neutron radiation to obtain partial transmutation to gaseous elements and measuring the electrical conductivity of said lithium strip after such exposure.

9. The method of measuring integrated neutron intensity comprising the steps of applying an electrical potential to the ends of a thin electrically conducting strip consisting of elements which transmute into gaseous elements under neutron bombardment, and exposing the strip to neutron radiation to effect partial transmutation of the elements into gaseous elements, whereby the electrical conductivity of the strip calculated before and after irradiating the strip is a measure of the integrated neutron intensity.

10. Apparatus for measuring integrated neutron intensity comprising an evacuated tube, a strip of material that transmutes to a gas after being subjected to neutron bombardment disposed within the tube, and means to measure the electrical conductivity of the strip connected to the ends of the strip.

ANDREW M. MacMAHON.
ARTHUR H. SNELL.

REFERENCES CITED

The following references are of record in the file of this patent:

UNITED STATES PATENTS

| Number | Name | Date |
|---|---|---|
| 1,023,485 | Thowless | Apr. 16, 1912 |
| 1,229,740 | Furstenau | June 12, 1917 |
| 2,186,757 | Kallmann | Jan. 9, 1940 |
| 2,188,115 | Kallmann | Jan. 23, 1940 |
| 2,220,509 | Brons | Nov. 5, 1940 |
| 2,288,718 | Kallmann | July 7, 1942 |

OTHER REFERENCES

Amoldi et al.: Proceedings of the Royal Society of London (A), vol. 149, 1935, pp. 522, 539, and 540.

Booth et al.: Proceedings of the Royal Society of London (A), vol. 161, 1937, pp. 248 and 254–260.